(12) United States Patent
Ossher et al.

(10) Patent No.: US 11,768,851 B2
(45) Date of Patent: Sep. 26, 2023

(54) SYSTEMS AND METHODS FOR FACILITATING DATA TRANSFORMATION

(71) Applicant: Palantir Technologies Inc., Denver, CO (US)

(72) Inventors: Joel Ossher, Vienna, VA (US); David Xiao, Menlo Park, CA (US)

(73) Assignee: Palantir Technologies Inc., Denver, CO (US)

( * ) Notice: Subject to any disclaimer, the term of this patent is extended or adjusted under 35 U.S.C. 154(b) by 0 days.

(21) Appl. No.: 17/877,603

(22) Filed: Jul. 29, 2022

(65) Prior Publication Data

US 2022/0365948 A1     Nov. 17, 2022

Related U.S. Application Data

(63) Continuation of application No. 16/572,434, filed on Sep. 16, 2019, now Pat. No. 11,416,512, which is a continuation of application No. 15/918,667, filed on Mar. 12, 2018, now Pat. No. 10,482,099, which is a continuation of application No. 15/383,787, filed on Dec. 19, 2016, now Pat. No. 9,946,777.

(51) Int. Cl.
*G06F 16/00*     (2019.01)
*G06F 16/25*     (2019.01)
*G06F 16/21*     (2019.01)

(52) U.S. Cl.
CPC .......... *G06F 16/258* (2019.01); *G06F 16/21* (2019.01); *G06F 16/212* (2019.01); *G06F 16/25* (2019.01)

(58) Field of Classification Search
CPC ...... G06F 16/258; G06F 16/21; G06F 16/212; G06F 16/25
See application file for complete search history.

(56) References Cited

U.S. PATENT DOCUMENTS

| | | | |
|---|---|---|---|
| 5,596,746 A | 1/1997 | Shen et al. | |
| 6,289,338 B1 | 9/2001 | Stoffel et al. | |
| 6,463,404 B1 | 10/2002 | Appleby | |
| 6,523,172 B1 | 2/2003 | Martinez-Guerra et al. | |
| 6,539,538 B1 | 3/2003 | Brewster et al. | |

(Continued)

FOREIGN PATENT DOCUMENTS

| | | |
|---|---|---|
| CA | 2666364 | 1/2015 |
| DE | 102014204840 | 9/2014 |

(Continued)

OTHER PUBLICATIONS

"A Tour of Pinboard," <http://pinboard.in/tour> as printed May 15, 2014 in 6 pages.

(Continued)

*Primary Examiner* — Syed H Hasan
(74) *Attorney, Agent, or Firm* — Sheppard Mullin Richter & Hampton LLP

(57) ABSTRACT

Systems and methods are provided for facilitating the transformation of data from a tabular data set organized according to a data schema to an object based data set organized according to data ontology. The data schema and the data ontology may be used to generate a custom coding language suitable for facilitating the creation of a transform script. Error checking, type checking, autocomplete, and preview tools may be provided to permit the verification of the transform script as it is created.

16 Claims, 5 Drawing Sheets

(56) References Cited

U.S. PATENT DOCUMENTS

| | | | |
|---|---|---|---|
| 6,640,231 B1 | 10/2003 | Andersen et al. | |
| 6,748,481 B1 | 6/2004 | Parry et al. | |
| 6,877,137 B1 | 4/2005 | Rivette et al. | |
| 7,027,974 B1 | 4/2006 | Busch et al. | |
| 7,089,541 B2 | 8/2006 | Ungar | |
| 7,113,939 B2 | 9/2006 | Chou et al. | |
| 7,237,192 B1 | 6/2007 | Stephenson et al. | |
| 7,240,330 B2 | 7/2007 | Fairweather | |
| 7,533,069 B2 | 5/2009 | Fairweather | |
| 7,685,083 B2 | 3/2010 | Fairweather | |
| 7,877,421 B2 | 1/2011 | Berger et al. | |
| 7,962,495 B2 | 6/2011 | Jain et al. | |
| 8,117,022 B2 | 2/2012 | Linker | |
| 8,132,149 B2 | 3/2012 | Shenfield et al. | |
| 8,271,948 B2 | 9/2012 | Talozi et al. | |
| 8,332,354 B1 | 12/2012 | Chatterjee et al. | |
| 8,418,085 B2 | 4/2013 | Snook et al. | |
| 8,489,623 B2 | 7/2013 | Jain et al. | |
| 8,560,494 B1 | 10/2013 | Downing | |
| 8,645,825 B1 | 2/2014 | Cornea et al. | |
| 8,689,182 B2 | 4/2014 | Leithead et al. | |
| 8,855,999 B1 | 10/2014 | Elliot | |
| 8,903,717 B2 | 12/2014 | Elliot | |
| 8,930,897 B2 | 1/2015 | Nassar | |
| 9,009,827 B1 | 4/2015 | Albertson et al. | |
| 9,201,920 B2 | 12/2015 | Jain et al. | |
| 9,223,773 B2 | 12/2015 | Isaacson | |
| 9,229,952 B1 | 1/2016 | Meacham et al. | |
| 9,946,777 B1 | 4/2018 | Ossher | |
| 2003/0074187 A1 | 4/2003 | Ait-Mokhtar et al. | |
| 2003/0172053 A1 | 9/2003 | Fairweather | |
| 2003/0177112 A1 | 9/2003 | Gardner | |
| 2004/0044992 A1 | 3/2004 | Muller et al. | |
| 2004/0083466 A1 | 4/2004 | Dapp et al. | |
| 2004/0117769 A1 | 6/2004 | Lauzon et al. | |
| 2004/0221223 A1 | 11/2004 | Yu et al. | |
| 2004/0260702 A1 | 12/2004 | Cragun et al. | |
| 2005/0039119 A1 | 2/2005 | Parks et al. | |
| 2005/0050068 A1* | 3/2005 | Vaschillo | G06F 16/25 |
| 2005/0091420 A1 | 4/2005 | Snover et al. | |
| 2005/0183005 A1 | 8/2005 | Denoue et al. | |
| 2006/0155725 A1 | 7/2006 | Foster et al. | |
| 2006/0259517 A1* | 11/2006 | Urscheler | G06F 11/2038 |
| | | | 714/E11.073 |
| 2006/0271838 A1 | 11/2006 | Carro | |
| 2007/0074169 A1 | 3/2007 | Chess et al. | |
| 2007/0078872 A1 | 4/2007 | Cohen | |
| 2007/0112714 A1 | 5/2007 | Fairweather | |
| 2007/0143320 A1 | 6/2007 | Guarav | |
| 2007/0220268 A1 | 9/2007 | Krishnaprasad et al. | |
| 2007/0233709 A1 | 10/2007 | Abnous | |
| 2008/0034327 A1 | 2/2008 | Cisler et al. | |
| 2008/0140387 A1 | 6/2008 | Linker | |
| 2008/0148398 A1 | 6/2008 | Mezack et al. | |
| 2008/0177770 A1 | 7/2008 | Friedlander et al. | |
| 2008/0228467 A1 | 9/2008 | Womack et al. | |
| 2008/0235260 A1 | 9/2008 | Han et al. | |
| 2008/0281580 A1 | 11/2008 | Zabokritski | |
| 2009/0172821 A1 | 7/2009 | Daira et al. | |
| 2009/0177962 A1 | 7/2009 | Gusmorino et al. | |
| 2009/0228507 A1 | 9/2009 | Jain et al. | |
| 2009/0235185 A1* | 9/2009 | Gill | G06F 9/542 |
| | | | 715/760 |
| 2009/0254970 A1 | 10/2009 | Agarwal et al. | |
| 2010/0011282 A1 | 1/2010 | Dollard et al. | |
| 2010/0049728 A1* | 2/2010 | Chiticariu | G06F 16/258 |
| | | | 707/E17.044 |
| 2010/0204983 A1 | 8/2010 | Chung et al. | |
| 2010/0257015 A1 | 10/2010 | Molander | |
| 2010/0257515 A1 | 10/2010 | Bates et al. | |
| 2010/0306285 A1 | 12/2010 | Shah et al. | |
| 2010/0313119 A1 | 12/2010 | Baldwin et al. | |
| 2011/0016162 A1* | 1/2011 | Booth | G06F 16/81 |
| | | | 707/E17.108 |
| 2011/0202902 A1 | 8/2011 | Whelan | |
| 2011/0213791 A1 | 9/2011 | Jain et al. | |
| 2011/0258216 A1 | 10/2011 | Supakkul et al. | |
| 2012/0137235 A1 | 5/2012 | Ts et al. | |
| 2012/0191446 A1 | 7/2012 | Binsztok et al. | |
| 2012/0221553 A1 | 8/2012 | Wittmer et al. | |
| 2012/0304150 A1 | 11/2012 | Leithead et al. | |
| 2013/0024268 A1 | 1/2013 | Manickavelu | |
| 2013/0080876 A1 | 3/2013 | Freese | |
| 2013/0086482 A1 | 4/2013 | Parsons | |
| 2013/0091084 A1 | 4/2013 | Lee | |
| 2013/0124193 A1 | 5/2013 | Holmberg | |
| 2013/0204948 A1 | 8/2013 | Zeyliger et al. | |
| 2013/0225212 A1 | 8/2013 | Khan | |
| 2013/0238351 A1* | 9/2013 | Burns | G16H 10/20 |
| | | | 705/2 |
| 2013/0246560 A1 | 9/2013 | Feng et al. | |
| 2013/0251233 A1 | 9/2013 | Yang et al. | |
| 2013/0275446 A1 | 10/2013 | Jain et al. | |
| 2014/0019423 A1 | 1/2014 | Leinsberger et al. | |
| 2014/0047319 A1 | 2/2014 | Eberlein | |
| 2014/0244388 A1 | 8/2014 | Manouchehri et al. | |
| 2015/0046481 A1 | 2/2015 | Elliot | |
| 2015/0100559 A1 | 4/2015 | Nassar | |
| 2015/0142740 A1* | 5/2015 | Behuria | G06F 16/27 |
| | | | 707/634 |
| 2015/0142766 A1 | 5/2015 | Jain et al. | |
| 2015/0261847 A1 | 9/2015 | Ducott et al. | |
| 2017/0006135 A1 | 1/2017 | Siebel et al. | |
| 2017/0185674 A1 | 6/2017 | Tonkin et al. | |

FOREIGN PATENT DOCUMENTS

| | | |
|---|---|---|
| DE | 102014215621 | 2/2015 |
| EP | 1327941 | 7/2003 |
| EP | 2221725 | 8/2010 |
| EP | 2778913 | 9/2014 |
| EP | 2778914 | 9/2014 |
| EP | 2778986 | 9/2014 |
| EP | 2911078 | 8/2015 |
| EP | 3018553 | 5/2016 |
| GB | 2366498 | 3/2002 |
| GB | 2513007 | 10/2014 |
| GB | 2518745 | 4/2015 |
| NL | 2013306 | 2/2015 |
| NL | 2011642 | 8/2015 |
| WO | WO 2002/035376 | 5/2002 |
| WO | WO 2003/060751 | 7/2003 |
| WO | WO 2008/064207 | 5/2008 |
| WO | WO 2011/071833 | 6/2011 |

OTHER PUBLICATIONS

Anonymous, "BackTult—JD Edwards One World Version Control System," printed Jul. 23, 2007 in 1 page.

Barrasa et al., "Fund Finder: A case study of database-to-ontology mapping", printed Oct. 1, 2003, Retrieved from the Internet: http://oa.upm.es/5670/1/Workshop11.SemInt2003.pdf, Oct. 1, 2003, 6 pages.

Barrasa et al., "$R_2O$, an Extensible and Semantically Based Database-to-ontology Mapping Language", Retrieved from the Internet: http://www.cs.man.ac.uk/~ocorcho/documents/SWDB2004_BarrasaEtAl.pdf, Aug. 1, 2004, 18 pages.

Delicious, <http://delicious.com/> as printed May 15, 2014 in 1 page.

Geiger, Jonathan G., "Data Quality Management, The Most Critical Initiative You Can Implement", Data Warehousing, Management and Quality, Paper 098-29, SUGI 29, Intelligent Solutions, Inc., Bounder, CO, pp. 14, accessed Oct. 3, 2013.

Jeong et al., "Creating Semantic Data from Relational Database", 2013 International Conference on Social Computing, IEEE, Sep. 8, 2013, pp. 1081-1086.

Johnson, "Introduction to YACC and Bison", 2005, 11 pages.

Kahan et al., "Annotea: an Open RDF Infrastructure for Shared Web Annotations", Computer Networks, Elsevier Science Publishers B.V., vol. 39, No. 5, dated Aug. 5, 2002, pp. 589-608.

Klemmer et al., "Where Do Web Sites Come From? Capturing and Interacting with Design History," Association for Computing Machinery, CHI 2002, Apr. 20-25, 2002, Minneapolis, MN, pp. 8.

(56) References Cited

OTHER PUBLICATIONS

Kokossi et al., "D7-Dynamic Ontoloty Management System (Design)," Information Societies Technology Programme, Jan. 10, 2002, pp. 1-27.
Miklau et al., "Securing History: Privacy and Accountability in Database Systems," 3 rd Biennial Conference on Innovative Data Systems Research (CIDR), Jan. 7-10, 2007, Asilomar, California, pp. 387-396.
Morrison et al., "Converting Users to Testers: An Alternative Approach to Load Test Script Creation, Parameterization and Data Corellation," CCSC: Southeastern Conference, JCSC 28, 2, Dec. 2012, pp. 188-196.
Niepert et al., "A Dynamic Ontology for a Dynamic Reference Work", Joint Conference on Digital Libraries, Jun. 17_22, 2007, Vancouver, British Columbia, Canada, pp. 1-10.
Nivas, "Test Harness and Script Design Principles for Automated Testing of non-GUI or Web Based Applications," Performance Lab, Jun. 2011, pp. 30-37.
Notice of Allowance for U.S. Appl. No. 14/044,800 dated Sep. 2, 2014.
Notice of Allowance for U.S. Appl. No. 14/148,568 dated Aug. 26, 2015.
Notice of Allowance for U.S. Appl. No. 14/508,696 dated Jul. 27, 2015.
Notice of Allowance for U.S. Appl. No. 14/533,433 dated Sep. 1, 2015.
Notice of Allowance for U.S. Appl. No. 14/879,916 dated Jun. 22, 2016.
Notice of Allowance for U.S. Appl. No. 15/383,787 dated Sep. 20, 2017.
Official Communiation for U.S. Appl. No. 14/148,568 dated Mar. 26, 2015.
Official Communication for Australian Patent Application No. 2014201507 dated Feb. 27, 2015.
Official Communication for Australian Patent Application No. 2014201506 dated Feb. 27, 2015.
Official Communication for Australian Patent Application No. 2014201511 dated Feb. 27, 2015.
Official Communication for Canadian Patent Application No. 2666364 dated Jun. 4, 2012.
Official Communication for European Patent Application No. 14158977.0 dated Apr. 16, 2015.
Official Communication for European Patent Application No. 14158958.0 dated Apr. 16, 2015.
Official Communication for European Patent Application No. 14158958.0 dated Jun. 3, 2014.
Official Communication for European Patent Application No. 14158977.0 dated Jun. 10, 2014.
Official Communication for European Patent Application No. 14158977.0 dated Mar. 11, 2016.
Official Communication for European Patent Application No. 14158958.0 dated Mar. 11, 2016.
Official Communication for European Patent Application No. 14159464.8 dated Feb. 18, 2016.
Official Communication for European Patent Application No. 14159629.6 dated Jul. 31, 2014.
Official Communication for European Patent Application No. 15155845.9 dated Oct. 6, 2015.
Official Communication for European Patent Application No. 15192965.0 dated Mar. 17, 2016.
Official Communication for European Patent Application No. 17207860.2 dated Feb. 13, 2018.
Official Communication for Great Britain Patent Application No. 1404479.6 dated Aug. 12, 2014.
Official Communication for Great Britain Patent Application No. 1413935.6 dated Jan. 27, 2015.
Official Communication for Great Britain Patent Application No. 1404479.6 dated Jul. 9, 2015.
Official Communication for Great Britain Patent Application No. 1413935.6 dated Dec. 21, 2015.
Official Communication for Israel Patent Application No. 198253 dated Nov. 24, 2014.
Official Communication for Israel Patent Application No. 198253 dated Jan. 12, 2016.
Official Communication for Netherlands Patent Application No. 2013306 dated Apr. 24, 2015.
Official Communication for Netherlands Patent Application No. 2012434 dated Jan. 8, 2016.
Official Communication for New Zealand Patent Application No. 622414 dated Mar. 24, 2014.
Official Communication for New Zealand Patent Application No. 622484 dated Apr. 2, 2014.
Official Communication for New Zealand Patent Application No. 622404 dated Mar. 20, 2014.
Official Communication for New Zealand Patent Application No. 622497 dated Mar. 26, 2014.
Official Communication for New Zealand Patent Application No. 622497 dated Jun. 19, 2014.
Official Communication for New Zealand Patent Application No. 622389 dated Mar. 20, 2014.
Official Communication for New Zealand Patent Application No. 622513 dated Apr. 3, 2014.
Official Communication for U.S. Appl. No. 13/557,100 dated Apr. 7, 2016.
Official Communication for U.S. Appl. No. 14/025,653 dated Oct. 6, 2015.
Official Communication for U.S. Appl. No. 14/025,653 dated Mar. 3, 2016.
Official Communication for U.S. Appl. No. 14/134,558 dated Oct. 7, 2015.
Official Communication for U.S. Appl. No. 14/134,558 dated May 16, 2016.
Official Communication for U.S. Appl. No. 14/134,558 dated Aug. 26, 2016.
Official Communication for U.S. Appl. No. 14/148,568 dated Oct. 22, 2014.
Official Communication for U.S. Appl. No. 14/508,696 dated Mar. 2, 2015.
Official Communication for U.S. Appl. No. 14/526,066 dated Jan. 21, 2016.
Official Communication for U.S. Appl. No. 14/526,066 dated May 6, 2016.
Official Communication for U.S. Appl. No. 14/631,633 dated Feb. 3, 2016.
Official Communication for U.S. Appl. No. 14/879,916 dated Apr. 15, 2016.
Official Communication for U.S. Appl. No. 14/954,680 dated May 12, 2016.
Official Communication for U.S. Appl. No. 15/383,787 dated May 5, 2017.
Official Communication for U.S. Appl. No. 16/008,932 dated Sep. 26, 2018.
Palantir, "Extracting and Transforming Data with Kite," Palantir Technologies, Inc., Copyright 2010, pp. 38.
Palantir, "Kite Data-Integration Process Overview," Palantir Technologies, Inc., Copyright 2010, pp. 48.
Palantir, "Kite Operations," Palantir Technologies, Inc., Copyright 2010, p. 1.
Palantir, "Kite," https://docs.palantir.com/gotham/3.11.1.0/adminreference/datasources.11 printed Aug. 30, 2013 in 2 pages.
Palantir, "The Repository Element," https://docs.palantir.com/gotham/3.11.1.0/dataguide/kite_config_file.04 printed Aug. 30, 2013 in 2 pages.
Palantir, "Write a Kite Configuration File in Eclipse," Palantir Technologies, Inc., Copyright 2010, pp. 2.
Palantir, https://docs.palantir.com/gotham/3.11.1.0/dataguide/baggage/KiteSchema printed Aug. 30, 2013 in 1 page.
Palantir, https://docs.palantir.com/gotham/3.11.1.0/dataguide/baggage/KiteSchema.xsd printed Apr. 4, 2014 in 4 pages.
Palermo, "Memorandum," [Disclosure relating to U.S. Appl. No. 13/916,447, filed Jun. 12, 2013, and related applications], Jan. 31, 2014 in 3 pages.

(56) References Cited

OTHER PUBLICATIONS

Symantec Corporation, "E-Security Begins with Sound Security Policies," Announcement Symantec, Jun. 14, 2001.
Vavliakis et al., "RDOTE-Publishing Relational Databases into the Semantic Web," Journal of Systems & Software, vol. 86, No. 1, Jul. 16, 2012, pp. 89-99.
Wollrath et al., "A Distributed Object Model for the Java System," Conference on Object-Oriented Technologies and Systems, Jun. 17-21, 1996, pp. 219-231.
Extended European Search Report for EP Appln. No. 20152913.8 dated Apr. 3, 2020, 11 pages.
Notice of Allowance dated Apr. 8, 2022, issued in related U.S. Appl. No. 16/572,434 (9 pages).
Notice of Allowance dated Jul. 12, 2019, issued in related U.S. Appl. No. 15/918,667 (8 pages).

\* cited by examiner

SYSTEMS AND METHODS FOR FACILITATING DATA TRANSFORMATION

CROSS REFERENCE TO RELATED APPLICATIONS

This application is a continuation application of U.S. patent application Ser. No. 16/572,434, filed Sep. 16, 2019, which is a continuation of U.S. patent application Ser. No. 15/918,667, filed Mar. 12, 2018, now U.S. Pat. No. 10,482,099, which is a continuation of U.S. patent application Ser. No. 15/383,787, filed Dec. 19, 2016, now U.S. Pat. No. 9,946,777, the content of each of which are incorporated by reference in their entirety into the present disclosure.

FIELD OF THE INVENTION

This disclosure relates to approaches for facilitating data transformation.

BACKGROUND

Under some approaches, a platform for analyzing various data may be deployed. The data-analysis platform may support an object-based data modeling framework. Frequently, data may be collected in a tabular format. Importing tabular formatted data into an object-based data modeling platform may require applying the ontology of the object-based data platform to a tabular data set to transform the tabular data set into data that conforms as required for the object-based data modeling platform. Applying the ontology may require cleaning the data, applying a script to it, and then checking the results. Applying the script to the data may be a time consuming process, as the original data set may include millions or billions of data rows. Even small errors in the data transformation script may result in a failure of the data transformation. Such a failure may not be noticed until after the script has finished running, resulting in a significant waste of time and resources.

These and other drawbacks exist with conventional data management systems.

SUMMARY

A claimed solution rooted in computer technology overcomes problems specifically arising in the realm of computer technology. In various implementations, a computing system is configured to provide tools that facilitate the data transformation, permit the preview of the transformation, and allow for simplified deployment of the transformation. The computing system may analyze the schema of the origin data, receive an ontology of the target data, and generate a domain specific language permitting a user to code a transform from the origin data to the target data. The computer system, thus, generates a coding language specific to the origin data schema and the target data ontology. While a user is coding, the system may preview the effects of the newly written transform, permitting the user to perform in situ debugging before committing to applying the transform across the entire data set. In addition, the system may provide an autocomplete feature that suggests portions of code as a user works.

Transformation of tabular data so that it may be stored according to an object based ontology is a problem that arises specifically in the realm of computer based data analysis. A tabular based data system may store data in tables of rows and columns. An object based data system may include an ontology that provides definitions of data objects and potential links between the data objects. Translation between the two requires transforming the tabular based data into an object based format, creating objects from the tabled data and generating appropriate links between the tabled data. Implementations of the technology described herein may generate a domain specific language tailored for developing the software code to program a transformation from the tabular based data system to the object based system. The technology may further provide a template transformation from which a user may begin programming the data transformation. The technology may provide an auto-complete feature that may complete and/or correct entered lines of code based on the schema of the tabular system and the ontology of the object based system. In some implementations, an integrated development environment may incorporate the auto-complete feature. In some implementations, the technology may provide a preview of the transformed data so that a user may ensure that the newly drafted code will be successful in transforming the data set.

In an implementation, a system for performing an integration of an origin data set into a target data set is provided. The system may comprise one or more processors and a memory storing instructions. When executed by the one or more processors, the instructions may cause the system to receive the origin data set organized by an origin data set schema, receive a target data set ontology that defines data objects of the target data set, generate, according to the origin data set schema and the target data set ontology, a custom transform language, receive transform instructions according to the custom transform language, and integrate the origin data set into the target data set according to the received transform instructions.

In another implementation, a computer implemented method of integrating an origin data set into a target data set is provided. The method may be performed on a computer system having one or more physical processors programmed with computer program instructions that, when executed by the one or more physical processors, cause the computer system to perform the method. The method may comprise receiving, by the computer system, the origin data set organized by an origin data set schema, receiving, by the computer system, a target data set ontology defining data objects of the target data set, generating, by the computer system, according to the origin data set schema and the target data set ontology, a custom transform language, receiving, by the computer system, transform instructions according to the custom transform language, and integrating, by the computer system, the origin data set into the target data set according to the received transform instructions.

In another implementation, a system for performing an integration of an origin data set into a target data set is provided. The system may include one or more processors and a memory storing instructions. When executed by the one or more processors, the instructions may cause the system to receive the origin data set organized by an origin data set schema, receive a target data set ontology defining data objects of the target data set, generate, according to the origin data set schema and the target data set ontology, a custom transform language, receive transform instructions according to the custom transform language, integrate the origin data set into the target data set according to the received transform instructions.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the technology are utilized, and the accompanying drawings of which

DETAILED DESCRIPTION

The technology described herein relates to systems and methods for facilitating a data transformation. In some implementations, the technology may facilitate a data transformation between a tabular data structure and an object based data structure. Object based data structures may provide powerful tools for generating insights about data and links between data. Many systems may collect data in a tabular format, including rows and columns. Transforming tabular data into object based data may be necessary to access the insights available through an object based data representation. The technology described herein provides systems and methods for facilitating the transformation of data stored in a tabular form to an object based structure.

Figure 1:
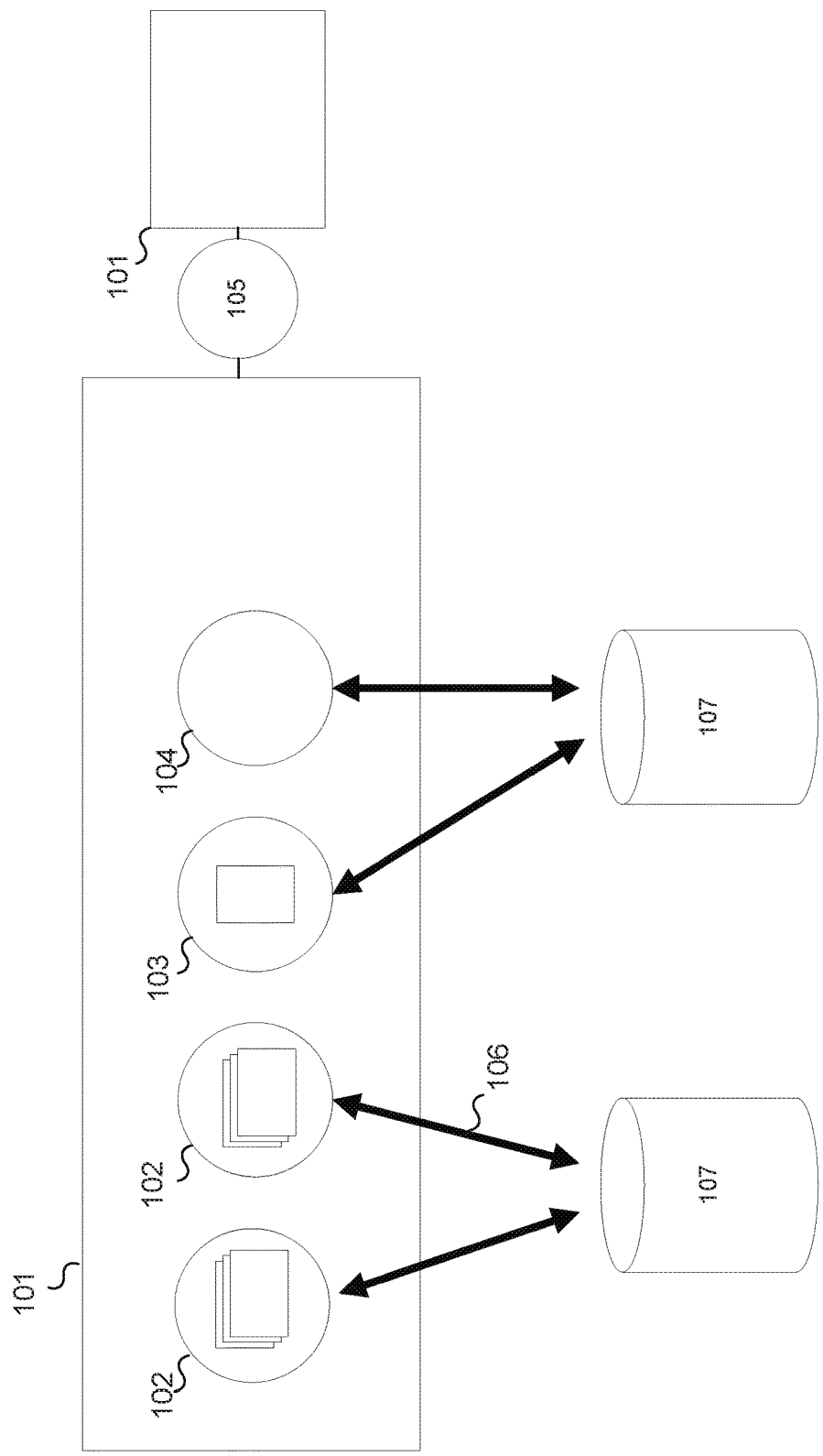
FIG. 1 depicts an object based data structure.

FIG. 1 depicts an object based data structure 100. Object based data structure 100 is centered around data objects 101. Each data object 101 may include several components, including one or more object properties 102, one or more data notes 103, one or more media components 104, and one or more data links 105. The origin of data stored in data object 101 may be stored in a data source record 106 that indicates a data source 107 of the stored data.

The object model is the framework for how data is stored. The object model is further defined by an ontology, defining the types of data and how they are stored in a given system. The ontology may be dynamic, updated to match evolving needs of the system and analysts. The ontology may define types of data objects 101, object properties 102, and data links 105. The ontology may further define which data types may be associated with each other. Each data types may have a URI (uniform resource identifier) that identifies it.

Object types define the kinds of things that may be represented in the system, and provide structure for data objects 101. Object types may be derived from, for example, entity types, event types, document types, and multimedia types. Event and document types may have temporal and geospatial data directly included within the data object 101 itself. An object type may define the number and composition of properties 102, notes 103, and media components 104 of a data object 101. The object type may further define what other types of objects that data links 105 may permit association with. For example, an entity object type may define a data object 101 used to store data about a person, and may include data properties 102 for storing name, address, occupation, e-mail address, phone number, etc. Data links 105 of an entity object 101 may permit the entity object 101 to be linked to other entity objects (e.g., friends or business associates), linked to event objects (e.g., events attended or invited to), linked to document objects (e.g., authored), etc.

Property types may define the type and behavior of input data. Property types may define the structure of the data stored in an object property 102. The property type may define one or more data fields, the type of data associated with the field, as well as tools that may operate on the data fields. Property types may be simple, including a single data field, and/or may be composite, including multiple data fields. For example, an e-mail property type may define an e-mail object property. For example, the e-mail address john@acmeinc.com may be stored in an e-mail object property as follows: URI: com.property.Email, Base Type: Composite, with these components: EMAIL_USERNAME with the value "john," EMAIL_DOMAIN with the value "acmeinc.com." Further, the e-mail property type may define tools for parsing and concatenating the username and the domain, depending on what is required.

Link types may define the types of data links 105 that can exist between two objects 101.

Links may be symmetric or asymmetric. All links may have one object that is considered the "parent" object, and the other that is the "child." In the case of symmetric links, e.g., "Spouse Of," which the parent and child objects are not contextually important. In the case of asymmetric links, like "Manager Of/Managed By," the parent and child may reflect the direction of the link.

Thus, the ontology of the object based data system may define the way in which data is organized in the object based data system. The ontology defines the types of objects that may be stored and the components of the defined data objects 101 as well as the manner in which the defined data objects may link to one another via data links 105.

Figure 2:
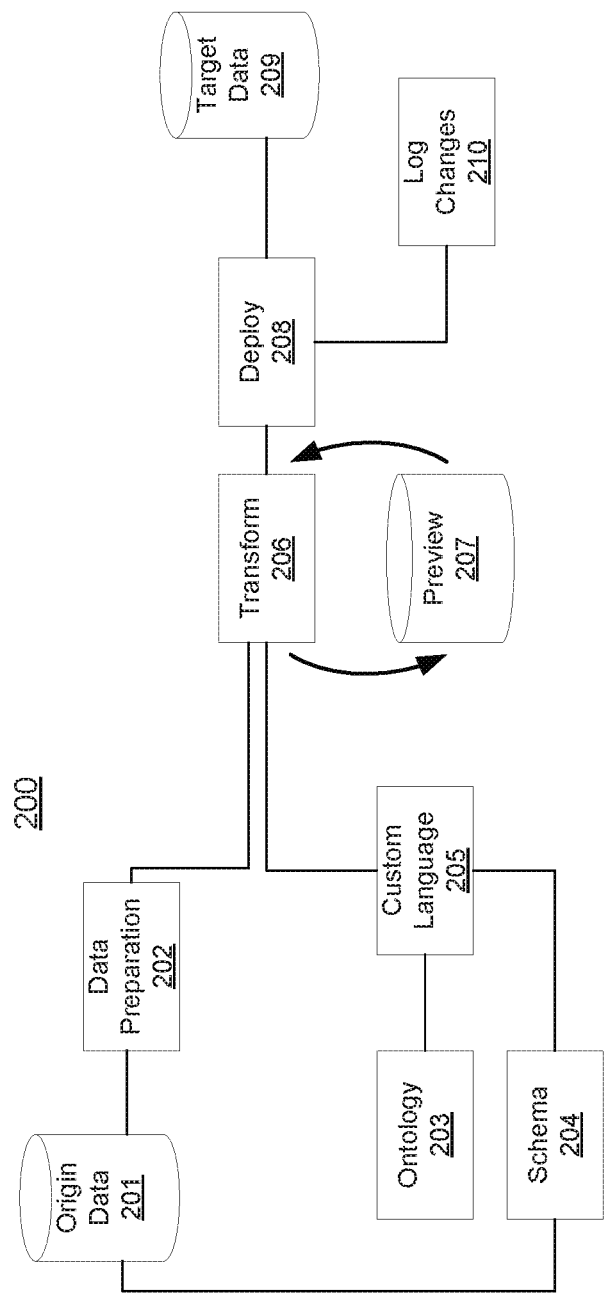
FIG. 2 depicts a process flow of a data transformation process, according to some implementations.

FIG. 2 depicts a process flow 200 of a data transformation process, according to some implementations of the technology. In the process 200 illustrated in FIG. 2, origin data set 201 is transformed into target data set 209.

Origin data set 201 may be viewed, analyzed, processed, and otherwise interacted with via a tabular data editor in a data preparation process at 202. In some implementations, a tabular data editor may be employed to clean or otherwise normalize origin data set 201.

Target data set ontology 203 and origin data schema 204 may be processed to generate a custom transform language during a custom transform language generation process 205. Custom transform language generation process 205 may further create a transform script template and supply the script template to a transform code editor. The cleaned origin data set 201 may be received by a code editor for authoring code in the custom transform language at transform script generation process 206. A user may employ the transform code editor to enter instructions in the custom transform language.

During the creation of a transform script, the transform code editor may provide several features to facilitate the generation of a transform script. In some implementations, type checking and/or error checking may be provided. As a user enters code into the transform code editor, the entered code may be checked against the origin data schema and the target data set ontology to ensure that references to the data of the origin data set and the target data set ontology are entered correctly. For example, entered code may be spell checked against the origin data schema and the target data set ontology. In another example, entered code may be type checked, e.g., to ensure that the code entered for the transform script does not attempt to store data of one type in a data field that expects a different type, simultaneous with code entry. Should a user enter transform code that violates the type system of the origin data schema and target data ontology, the entered code may be identified through highlighting, underlining, strike-through, bolding, or other action. In another example, the existence of origin data fields and target data fields may be verified during code entry. For example, if a user attempts to write transform code intended to transform data from a non-existent column of the origin data schema, the entered code may be identified as it is entered.

In some implementations, a preview of data transformation results based on the entered transform code may be provided. Transform code may be deployed across at least a portion of origin data set 201 as the code is entered. Thus, the entered code may be compiled and deployed upon entry, without waiting for completion of the transform script. The results of the deployment may be provided as a preview target data set 207. A user may view the preview target data set 207 in a data viewing module suitable for viewing object based data. The user may view the preview target data set 207 and ensure that data from the origin data set 201 has been transformed properly to conform with the target data set ontology 203. The user may then provide further revisions to the transform script through the transform code editor if the preview target data set 207 appears to be in error.

After completion of the transform script, the user may choose to deploy the completed script across all or a portion of the origin data set 201 at deployment process 208. The completed transform script may be deployed across the origin data set 201 according to user selection of origin data set 201 portions, according to updates to origin data set 201, according to updates to the transform script, and/or any other suitable criteria. Deployment of the transform script may provide updates to target data set 209. In some implementations, the entirety of a target data set 209 may be generated according to the deployment of the transform script. In some implementations, target data set 209 may be updated, modified, added to, subtracted from, or otherwise altered according to the transform script.

Deployment of the transform script may also be accompanied by the storage of data transformation information at storage process 201. Data transformation information may be stored with or in association with origin data set 201 and target data set 209. As stored with or in association with data objects 201 of target data set 209, data transformation information may include any or all of a time and date, a transform script version number, transform script code used to produce the data objects 201 associated with the data transformation information, errors occurring during the transformation, and any additional information generated during the transformation.

Figure 3:
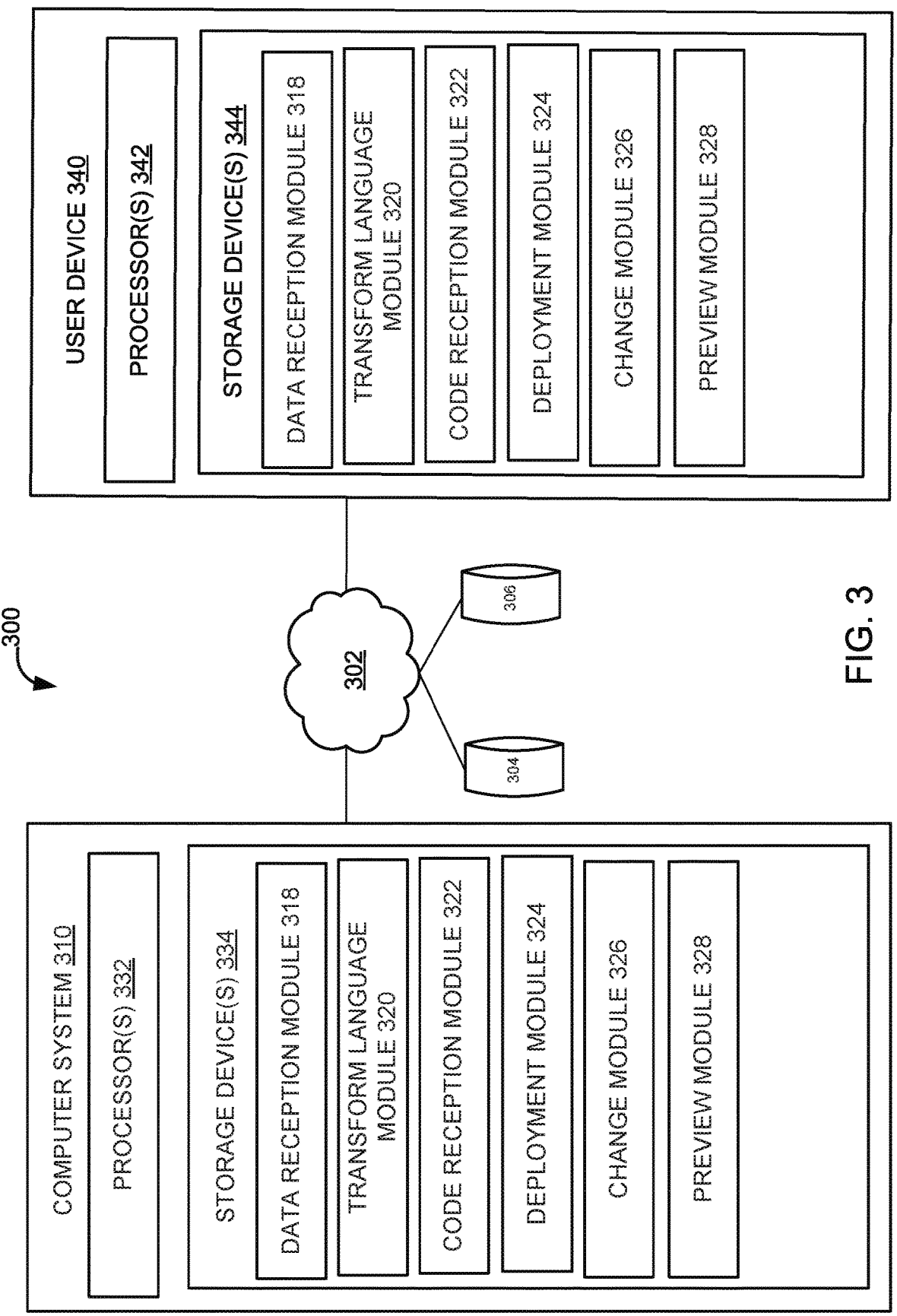
FIG. 3 depicts a system for facilitating data transformations.

FIG. 3 depicts a system 300 for determining relationships between non-conformities according to some implementations. In one implementation, system 300 may include a computer system 310, a user device 340, a tabular data module 304, and an object based data module 306 in communication via network 302, and/or other components. Tabular data module 304 and object based data module 306 are illustrated in FIG. 1 as separate from computer system 310 and user device 340. In some implementations, data modules 304, 306 may be stored on the computer system 310, user device 340, or at a remote location.

Tabular data module 304 may be a computer memory configured to store data. Tabular data module 304 may store a data set formatted with a tabular structure. A tabular data structure may be defined by a data schema, encompassing data schema related information including at least the names of the columns of the table, the data types of the columns, user descriptions of the columns, etc.

Object based data module 306 may be a computer memory configured to store data. Object based data module 306 may store a data set formatted with an object based structure according to an ontology, as described, e.g., with respect to FIG. 1.

Computer system 310 may be configured as a server (e.g., having one or more server blades, processors, etc.), a personal computer (e.g., a desktop computer, a laptop computer, etc.), a smartphone, a tablet computing device, and/or other device that can be programmed to receive tabular data, generate script editing tools, and transform the tabular data into object based data.

Figure 5:
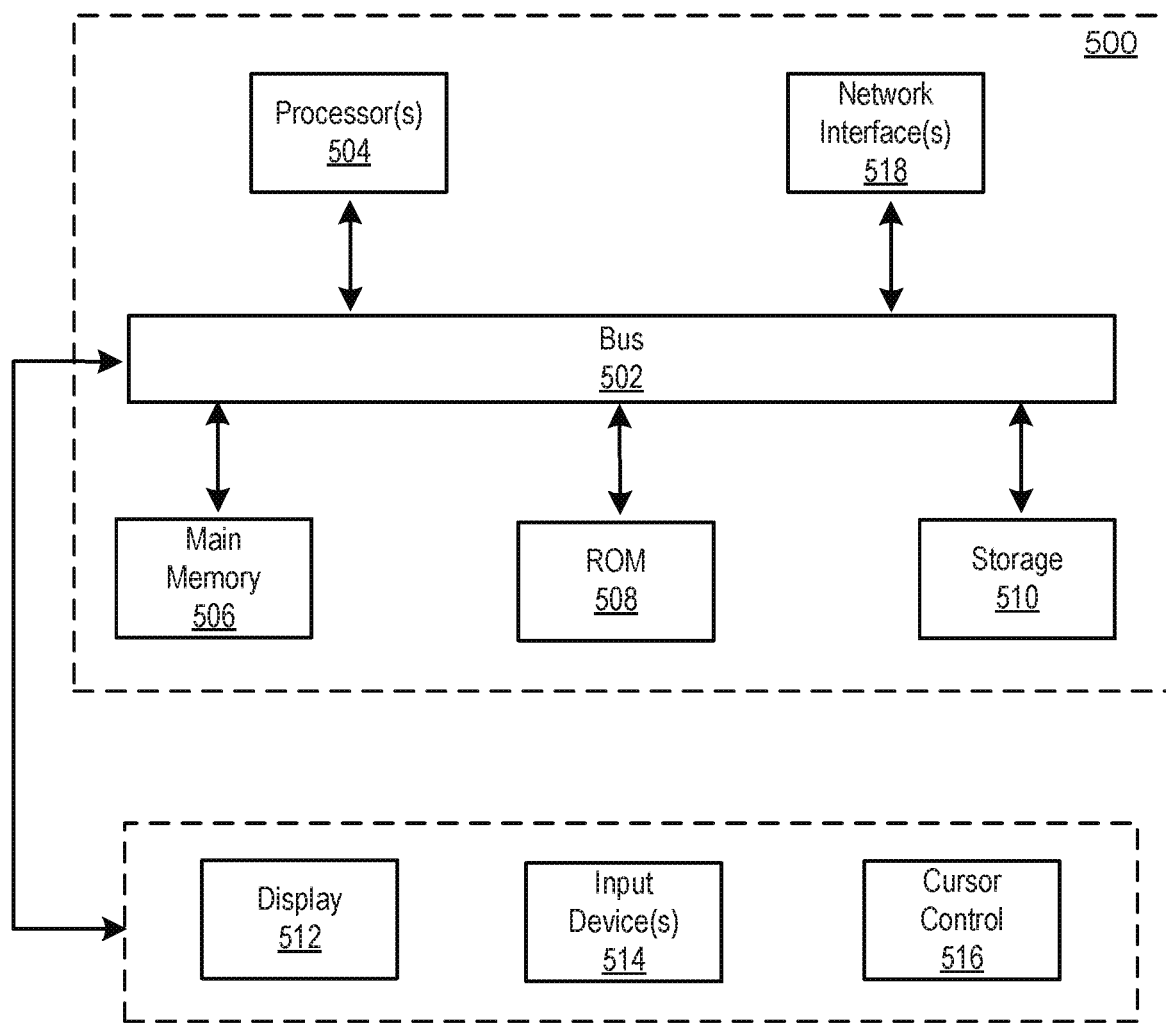
FIG. 5 depicts a block diagram of an example computer system in which any of the embodiments described herein may be implemented.

Computer system 310 may include one or more processors 332 (also interchangeably referred to herein as processors 332, processor(s) 332, or processor 332 for convenience), one or more storage devices 334, and/or other components. Processors 332 may be programmed by one or more computer program instructions stored on storage device 334. For example, processors 332 may be programmed by data reception module 318, transform language module 320, code reception module 322, deployment module 324, change module 326, preview module 328, and/or other instructions that program computer system 310 to perform various operations, each of which are described in greater detail herein. As used herein, for convenience, the various instruction modules will be described as performing an operation, when, in fact, the various instructions program the processors 332 (and therefore computer system 310) to perform the operation. Further details and features of a computer system 310 configured for implementing features of the described technology may be understood with respect to computer system 500 as illustrated in FIG. 5.

User device 340 may be configured as a server device, a gaming console, a handheld gaming device, a personal computer (e.g., a desktop computer, a laptop computer, etc.), a smartphone, a tablet computing device, and/or other device that can be programmed to receive tabular data, generate script editing tools, and transform the tabular data into object based data.

User device 340 may include one or more processors 342 (also interchangeably referred to herein as processors 342, processor(s) 342, or processor 342 for convenience), one or more storage devices 344, and/or other components. Processors 342 may be programmed by one or more computer program instructions. For example, processors 342 may be programmed by data reception module 318, transform language module 320, code reception module 322, deployment module 324, change module 326 and preview module 328, and/or other instructions that program computer system 310 to perform various operations, each of which are described in greater detail herein. As used herein, for convenience, the various instruction modules will be described as performing an operation, when, in fact, the various instructions program the processors 342 (and therefore user device 340) to perform the operation.

Various aspects of the transform facilitation system may operate on computer system 310 and/or on user device 340. That is, the various modules described herein may each operate on one or both of computer system 310 and/or user device 340. For example, in one implementation, a user device 340 comprising a client side laptop computer may run a code reception module 322 and a preview module 328, while other aspects of the system are run on computer system 310, acting as a server.

Data reception module 318 may be a software module in operation on computer system 310 and/or on user device 340. Data reception module 318 may include programming instructions that cause the system to receive, acquire, obtain, or otherwise gain access to an origin data set 201. The origin data set 201 may include a data set stored in tabular data module 304 according to a table based data system. The origin data set may be organized according to an origin data set schema, defining the rows, columns, and other structures of the tabular data.

Transform language module 320 may be a software module in operation on computer system 310 and/or on user device 340. Transform language module 320 may include programming instruction that cause computer system 310 and/or user device 340 to generate a custom transform language.

The transform language module 320 may access the origin data set schema 204 defining the structure of the origin data set. The transform language module may also access a target data set ontology 203, which defines the data objects of a target data set 209, as discussed above. Based on the origin data set schema 204 and the target data set ontology 203, transform language module 320 may generate a custom transform language for writing the programming instructions of a transform for transforming an tabular structure origin data set 201 into an object based target data set 209. The custom transform language may include functions and methods specifically operable to receive data formatted according to the origin data set schema and to output data formatted according to the target data set ontology.

Transform language module 320 may further be configured to generate a template transform file according to the origin data set schema 204 and the target data set ontology 203. The template transform file may be provided with software instructions in the custom transform language that may be required of a transform from the origin data set 201 to the target data set 209. For example, the template transform file may be provided with software instructions for importing data according to the origin data set schema 204 and for exporting data according to the target data set ontology 203.

Code reception module 322 may be a software module in operation on computer system 310 and/or on user device 340. Code reception module 322 may include programming instructions that cause computer system 310 and/or user device 340 to receive software instructions in the custom transform language and to provide tools that facilitate authoring a transform from the origin data set 201 to the target data set 209.

Code reception module 322 may receive software instructions provided in the custom transform language. In some implementations, code reception module 322 may operate on a user device, and receive software instructions as a user enters them. That is, code reception module 322 may provide all of the features and options of a code editor. In some implementations, code reception module 322 may operate on computer system 310, and may receive code directly entered via user device 340 over network 302 and/or may receive completed software instructions from user device 340 for compiling.

Code reception module 322 may interpret software instructions as they are entered and offer features to assist in entering the software instructions. Code reception module 322 may offer an auto-complete feature. During entry of software instructions, code reception module 322 may provide auto-complete options to the user based on partially entered software instructions and stored information about the origin data schema 204 and target data ontology 203. For example, as a user begins to enter a line of code calling to transform a series of entries from the origin data into a series of objects in the target data, code reception module 322 may offer the user autocomplete options to complete words and phrases that reference the origin data schema, to complete words and phrases that reference the target data ontology, and to complete words and phrases that call functions, methods, and other operations of the custom transfer language.

Code reception module 322 may offer an error checking feature. Code reception module 322 may interpret software instructions as they are entered to determine if errors have been made in their entry. Code reception module 322 may access the origin data schema 204 and the target data ontology 203 to perform error checking. For example, where the user has entered code that references the origin data schema, but has entered in, for example, a column name that either does not exist in the origin data schema or is misspelled, code reception module 322 may identify the entered code as in error, for example by underlining it. Code reception module 322 may error check code that references the target data ontology in a similar fashion. In some implementations, code reception module 322 may type check, e.g., alert a user to errors in ontology usage as well. For example, if a user attempts to enter code that assigns an incorrect data type to an object property data field, the entered code may be identified as in error. In another example, if a user attempts to assign an object property to an object type that does not accept such a property, the entered code may be identified as in error. For example, if a user enters code that attempts to assign a "gender" object property to a "organization" object type, code reception module 322 may recognize the error and so identify it.

Deployment module 324 may be a software module in operation on computer system 310 and/or on user device 340. Deployment module 324 may include programming instruction that cause computer system 310 to deploy the user entered transform instructions.

Deployment module 324 may compile the transform instructions entered by the user. The compiled code may then be deployed across at least a portion of the origin data set to transform the origin data set to object based data that becomes at least a portion of the target data set.

Deployment module 324 may transform all or a portion of the origin data set 201. The origin data set 201 may include millions or billions of entries. Transforming each and every entry of the origin data set 201 during each deployment may be unnecessary. Accordingly, deployment module 324 may operate to transform only a portion of the origin data set 201. In some implementations, deployment module 324 may operate to transform only a portion of the origin data set 201 that is new and/or modified since the last deployment of the compiled transform instructions. That is, the determination of the portion of the origin data set 201 for transformation may be based on modifications of the origin data set 201. In some implementations, deployment module 324 may determine to deploy the compiled transform instructions across the origin data set 201 according to modifications made to the transform instructions. For example, where a user has updated a portion of the transform instructions that operate on a specific field of the origin data set 201, deployment module 324 may deploy the transform instructions across only those entries of the origin data set having the specific field.

Deployment module 324 may generate all or a portion of the target data set 209. A target data set 209 may include millions or billions of objects. Recreating data objects 101 that have seen no change may be time consuming and unnecessary. As discussed above, deployment module 324 may deploy the compiled transform code against a portion of the origin data set. Similarly, the transformed data may include only a portion of the target data set. Transformed data may include updates to existing objects 101 within the target data set and/or may include the addition of new objects 101 to the target data set.

Change module 326 may be a software module in operation on computer system 310 and/or on user device 340. Change module 326 may include programming instruction that cause computer system 310 to store information about deployed data transforms.

Change module 326 may cause data transform information to be stored, for example with or in association with the origin data set 201 and the target data set 209. Stored data transform information may include information about a version of compiled transform instructions used for transforming a specific portion of data and a corresponding date. Thus, when a portion of the origin data set 201 is transformed for integration with the target set 209, data transform information about the transform code used and the time and date of transform may be stored with or in association with the portion of the origin data set 201 that was transformed as well as the portion of the target data set 209 that resulted. Accordingly, the system may keep track of changes to the data sets and how they were performed. This information may be used for error checking as well as determining which portions of the data sets require updating.

If an error in one of the data sets arises, the data transform information may provide insight into a cause of the error. For example, a user, in analyzing data from the target data set 209 may find that a data object 101 is linked improperly to other data objects 101. The user may access the data transform information associated with the defective objects 101 to determine a time and date of transform as well as determine which version of the transform code was used to produce the data objects 201. The user may then more easily determine defects in the transform code, repair it, and deploy the corrected transform code over only those portions of the origin data set 201 for which is was previously deployed. Thus, errors in the target data set 209 may be repaired by the user without having to rerun the entire data set through the transform.

Preview module 328 may be a software module in operation on computer system 310 and/or on user device 340. Preview module 328 may include programming instruction that cause computer system 310 and/or user device 340 to provide a preview of transform results according to transform instructions as they are entered by a user into code reception module 322.

Preview module 328 may permit a user to preview results of transform code as it is entered into code reception module 322. Preview module 328 may obtain, receive, or otherwise acquire transform code instructions entered in the custom transform language, apply the entered instructions to a portion of the origin data set 201, and provide a preview data set corresponding to how the code instructions will transform the origin data set 201 when fully compiled and deployed.

Although illustrated in FIG. 3 as a single component, computer system 310 and user device 340 may each include a plurality of individual components (e.g., computer devices) each programmed with at least some of the functions described herein. In this manner, some components of computer system 310 and/or user device 340 may perform some functions while other components may perform other functions, as would be appreciated. The one or more processors 332 may each include one or more physical processors that are programmed by computer program instructions. The various instructions described herein are exemplary only. Other configurations and numbers of instructions may be used, so long as the processor(s) 332 are programmed to perform the functions described herein.

Furthermore, it should be appreciated that although the various instructions are illustrated in FIG. 3 as being co-located within a single processing unit, in implementations in which processor(s) 332 includes multiple processing units, one or more instructions may be executed remotely from the other instructions.

Additionally, the modular software breakdown as illustrated in FIG. 3 is prepared for illustrative purposes only. The various instructions described with respect to specific software modules may be implemented by alternative software modules configured in different arrangements and with alternative function sets.

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 332 may be programmed by one or more additional instructions that may perform some or all of the functionality attributed herein to one of the instructions.

The various instructions described herein may be stored in a storage device 334, which may comprise random access memory (RAM), read only memory (ROM), and/or other memory. The storage device may store the computer program instructions (e.g., the aforementioned instructions) to be executed by processor 332 as well as data that may be manipulated by processor 332. The storage device may comprise floppy disks, hard disks, optical disks, tapes, or other storage media for storing computer-executable instructions and/or data.

The various components illustrated in FIG. 3 may be coupled to at least one other component via a network 302, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 3, as well as in other drawing Figures, different numbers of entities than those depicted may be used. Furthermore, according to various implementations, the components described herein may be implemented in hardware and/or software that configure hardware.

Figure 4:
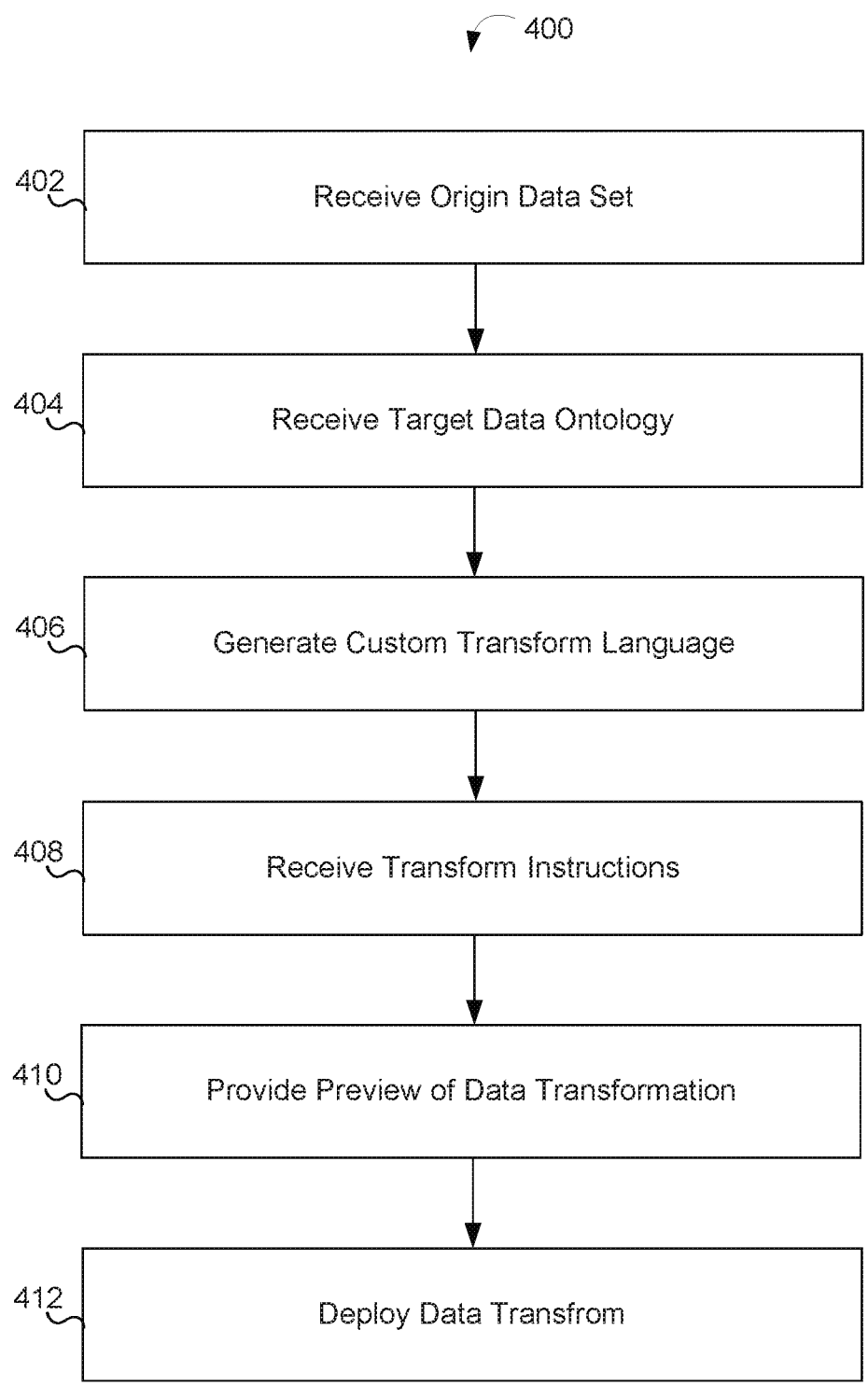
FIG. 4 depicts a process flow chart of a method for performing data transformations, according to some implementations.

FIG. 4 depicts a process flow chart of a method for facilitating data transformations, according to some implementations. The various processing operations and/or data flows depicted in FIG. 4 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 402, data transformation process may include receiving an origin data set 201. The received origin data set 201 may be received by data reception module 318. The origin data set 201 may be organized according to an origin data schema 204. Origin data schema 204 may specify a tabular format for data of the origin data set 201. Receiving the origin data set 201 may include receiving all or a portion of a data set stored in tabular data module 304 as well as the origin data schema 204. The received origin data may be stored in a local or temporary memory for action by the system. In some implementations, receiving the origin data set 201 may include obtaining access to the origin data set 201 in its permanent location.

In an operation 404, data transformation process 400 may include receiving a target data set ontology 203. The target data set ontology 203 may define the data objects and relations between data objects of an object based data set. Receiving the target data set ontology 203 may include obtaining access to, requesting, and/or otherwise acquiring the target data set ontology 203, and may be performed by transform language module 320. The target data set ontology 203 may be stored in object based data module 306 or in another location. Receiving the target data set ontology 203 may include receiving all of the ontological details defining an object based data set, as described above with respect to FIG. 1.

In an operation 406, data transformation process 400 may include generating a custom transform language. Transform language module 320 may access the target data set ontology 203 and the origin data schema 204 to generate a custom transform language. The custom transform language may be generated with functions, methods, and other features specifically tailored for the task of transforming data stored according to origin data schema 204 to data objects 101 storable according to target data set ontology 203.

In an operation 408, data transformation process 400 may include receiving transform instructions according to the custom transformation language. Code reception module 322 may receive instructions according to the custom transformation language, for example, via a transform code editor generated by the code reception module 322. Code reception module 322 may further be configured to perform type and error checking on transform instructions that are received, as they are received. Type and error checking may be performed according to the origin data schema 204 and target data set ontology 203. Code reception module 322 may further be configured to provide autocomplete options for partially entered transform instructions according to the origin data schema 204 and target data set ontology 203.

In an operation 410, data transformation process 400 may include providing a preview target data set based on the received transform instruction. Preview module 328 may acquire entered transform instructions from code reception module 322, and may compile and deploy the acquired transform instructions across all or a portion of origin data set 201. The deployed transform instructions may transform data of the origin data set 201 into a preview target data set 207 organized according to a target data set ontology 204. Preview module 328 may acquire and compile entered transform instructions as they are received by code reception module 322, but before an entirety of the transform instructions are completed. Applying the received transform instructions to the origin data set 201 as they are received may permit a user to view the generated preview target data set 210 prior to attempting to deploy the transform instructions across larger portions of the origin data set 201.

In an operation 412, data transformation process 400 may include integrating the origin data set 201 into the target data set 209. Deployment module 324 may acquire and compile transform instructions from code reception module 322. The compiled transform instructions may be deployed across all or a portion of the origin data set 201 to integrate selected data of the origin data set 201 into target data set 209. The transform instructions may transform data stored according to the origin data schema 204 into data storable by the target data set ontology 203. The newly transformed data may be integrated with the target data set 209. Deployment module 124 may act across any portion or an entirety of the origin data set 201, and may produce transformed data constituting any portion or an entirety of the target set 209.

Selections of origin data set 201 to be transformed may be selected according to data transformation information stored about previous data transformations, for example, transformation times and dates, and transform scripts used to execute the transforms.

Data transformation process 400, accordingly, facilitates the creation and deployment of a transform script capable of transforming all or a portion of a tabular based origin data set 201 into an object based target data set 209, according to a target data set ontology 203.

FIG. 5 depicts a block diagram of an example computer system 500 in which any of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a cathode ray tube (CRT) or LCD display (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

The computer system 500 also includes a communication interface 518 coupled to bus 502. Communication interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational NoSQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

The invention claimed is:

1. A system for performing an integration of an origin data set into a target data set, the system comprising:
    one or more processors; and
    memory storing instructions that, when executed by the one or more processors, cause the system to:
        receive the origin data set, the origin data set being organized according to an origin data set schema specifying a format for data of the origin data set;
        receive a target data set ontology, the target data set ontology defining data objects of the target data set;
        generate, according to the origin data set schema and the target data set ontology, a transform language according to the origin data set schema and the target data set ontology, wherein the receiving or generating of the transform code comprises:
            receiving an input of a portion of the transform code;
            determining that the portion of the transform code references the origin data set schema or the target data set ontology;
            automatically generating one or more words, phrases, or calls to functions or operations that reference the origin data set schema or the target data set ontology;
            receiving a selection of a word, phrase, or call from the one or more words, phrases, or calls; and
            appending the selection into the portion of the transform code;
        receive or generate transform code according to the transform language according to the origin data set schema and the target data set ontology;
        integrate the origin data set into the target data set according to the received transform code to generate the target data set;
        receive an indication of a change in the origin data set; and
        generate a portion of the target dataset corresponding to the change in the origin data set according to the transform code.

2. The system of claim 1, wherein the generating is limited to the portion of the target dataset corresponding to the change in the origin data set; and the updating comprises deploying the transform code across only the portion.

3. The system of claim 1, wherein the instructions further cause the system to:
    store information of a version of the transform code used to update the portion of the target dataset; and
    store information regarding the change in the origin data set.

4. The system of claim 1, wherein the generating of the portion of the target dataset comprises adding one or more new objects and modifying one or more existing objects.

5. The system of claim 1, wherein the change in the origin data set comprises additional data in the origin data set.

6. The system of claim 1, wherein the change in the origin data set comprises modified data in the origin data set.

7. A computer-implemented method comprising:
    receiving an origin data set, the origin data set being organized according to an origin data set schema specifying a format for data of the origin data set;
    receiving a target data set ontology, the target data set ontology defining data objects of a target data set;
    generating, according to the origin data set schema and the target data set ontology, a transform language according to the origin data set schema and the target data set ontology;
    receiving or generating transform code according to the transform language according to the origin data set schema and the target data set ontology, wherein the receiving or generating of the transform code comprises:
        receiving an input of a portion of the transform code;
        determining that the portion of the transform code references the origin data set schema or the target data set ontology;
        automatically generating one or more words, phrases, or calls to functions or operations that reference the origin data set schema or the target data set ontology;
        receiving a selection of a word, phrase, or call from the one or more words, phrases, or calls; and
        appending the selection into the portion of the transform code;
    integrating the origin data set into the target data set according to the received transform code to generate the target data set;
    receiving an indication of a change in the origin data set; and generating a portion of the target dataset corresponding to the change in the origin data set according to the transform code.

8. The computer-implemented method of claim 7, wherein the generating is limited to the portion of the target dataset corresponding to the change in the origin data set; and the updating comprises deploying the transform code across only the portion.

9. The computer-implemented method of claim 7, further comprising:
storing information of a version of the transform code used to update the portion of the target dataset; and
storing information regarding the change in the origin data set.

10. The computer-implemented method of claim 7, wherein the generating of the portion of the target dataset comprises adding one or more new objects and modifying one or more existing objects.

11. The computer-implemented method of claim 7, wherein the change in the origin data set comprises additional data in the origin data set.

12. The computer-implemented method of claim 7, wherein the change in the origin data set comprises modified data in the origin data set.

13. A non-transitory computer readable medium comprising instructions that, when executed, cause one or more processors to perform a method of integrating an origin data set into a target data set, the method comprising:
receiving an origin data set, the origin data set being organized according to an origin data set schema specifying a format for data of the origin data set;
receiving a target data set ontology, the target data set ontology defining data objects of a target data set;
generating, according to the origin data set schema and the target data set ontology, a transform language according to the origin data set schema and the target data set ontology;
receiving or generating transform code according to the transform language according to the origin data set schema and the target data set ontology, wherein the receiving or generating of the transform code comprises:
receiving an input of a portion of the transform code;
determining that the portion of the transform code references the origin data set schema or the target data set ontology;
automatically generating one or more words, phrases, or calls to functions or operations that reference the origin data set schema or the target data set ontology;
receiving a selection of a word, phrase, or call from the one or more words, phrases, or calls; and
appending the selection into the portion of the transform code;
integrating the origin data set into the target data set according to the received transform code to generate the target data set;
receiving an indication of a change in the origin data set; and
generating a portion of the target dataset corresponding to the change in the origin data set according to the transform code.

14. The non-transitory computer readable medium of claim 13, wherein the generating is limited to the portion of the target dataset corresponding to the change in the origin data set; and the generating comprises deploying the transform code across only the portion.

15. The non-transitory computer readable medium of claim 13, wherein the method further comprises:
storing information of a version of the transform code used to update the portion of the target dataset; and
storing information regarding the change in the origin data set.

16. The non-transitory computer readable medium of claim 13, wherein the generating of the portion of the target dataset comprises adding one or more new objects and modifying one or more existing objects.

\* \* \* \* \*